United States Patent
Wang et al.

(10) Patent No.: US 12,196,144 B2
(45) Date of Patent: Jan. 14, 2025

(54) SYSTEMS AND METHODS FOR AFTERTREATMENT SYSTEM THERMAL MANGEMENT USING CYLINDER DEACTIVATION AND/OR INTAKE-AIR THROTTLING

(71) Applicants: Cummins Inc., Columbus, IN (US); Tula Technology, Inc., San Jose, CA (US)

(72) Inventors: Kunpeng Wang, Wuhan (CN); Ke Wang, Beijing (CN); Yuan Zoe, Beijing (CN); Zhou Cao, Beijing (CN)

(73) Assignees: Cummins Inc., Columbus, IN (US); Tula Technolgy, Inc., SanJose, CA (US)

( * ) Notice: Subject to any disclaimer, the term of this patent is extended or adjusted under 35 U.S.C. 154(b) by 0 days.

(21) Appl. No.: 18/497,688

(22) Filed: Oct. 30, 2023

(65) Prior Publication Data
US 2024/0141845 A1    May 2, 2024

(30) Foreign Application Priority Data
Oct. 31, 2022   (CN) .......................... 202211351751.9

(51) Int. Cl.
*F02D 41/02*      (2006.01)
*F01N 3/20*       (2006.01)
(Continued)

(52) U.S. Cl.
CPC ......... *F02D 41/024* (2013.01); *F01N 3/2066* (2013.01); *F02D 41/0087* (2013.01);
(Continued)

(58) Field of Classification Search
CPC .... F02D 41/0087; F02D 41/024; F02D 41/18; F02D 2041/1412; F02D 2200/0802; F01N 3/2066
See application file for complete search history.

(56) References Cited

U.S. PATENT DOCUMENTS

| | | |
|---|---|---|
| 10,161,325 B2 | 12/2018 | Zur Loye et al. |
| 11,306,672 B2 | 4/2022 | Younkins et al. |
| (Continued) | | |

FOREIGN PATENT DOCUMENTS

| | | | |
|---|---|---|---|
| JP | 2003227337 A | * | 8/2003 |
| WO | WO-2021/014427 A1 | | 1/2021 |
| WO | WO-2021/242228 A1 | | 12/2021 |

*Primary Examiner* — Audrey B. Walter
(74) *Attorney, Agent, or Firm* — Foley & Lardner LLP

(57) ABSTRACT

Systems and methods for aftertreatment system thermal management using cylinder deactivation and/or intake-air throttling are disclosed. Systems and methods for thermal management of an aftertreatment system are provided herein. A controller coupled to an engine and an exhaust aftertreatment system is configured to: receive a first temperature value associated with the exhaust aftertreatment system and a second temperature value associated with the engine; determine, based on comparing the first temperature value to a first threshold, a thermal management mode including a first thermal management mode or a second thermal management mode; determine, responsive to determining the thermal management mode and based on comparing the second temperature value to a second threshold, an operating mode for the thermal management mode including at least one of a first operating mode or a second operating mode; and initiate the at least one of the first or the second operating mode.

17 Claims, 5 Drawing Sheets

(51) Int. Cl.
 _F02D 41/00_  (2006.01)
 _F02D 41/18_  (2006.01)
 _F02D 41/14_  (2006.01)

(52) U.S. Cl.
 CPC ...... _F02D 41/18_ (2013.01); _F02D 2041/1412_ (2013.01); _F02D 2200/0802_ (2013.01)

(56) References Cited

U.S. PATENT DOCUMENTS

2018/0223757 A1   8/2018  McCarthy et al.
2018/0320617 A1* 11/2018  Ahmed .................. F01N 3/043
2021/0131360 A1   5/2021  Martin et al.

\* cited by examiner

SYSTEMS AND METHODS FOR AFTERTREATMENT SYSTEM THERMAL MANGEMENT USING CYLINDER DEACTIVATION AND/OR INTAKE-AIR THROTTLING

CROSS-REFERENCE TO RELATED APPLICATIONS

This U.S. patent application claims priority to China National Application No. 202211351751.9, filed Oct. 31, 2022, which is incorporated herein by reference in its entirety.

TECHNICAL FIELD

The present disclosure relates to exhaust aftertreatment systems. More particularly, the present disclosure relates to systems and methods for thermal management of an aftertreatment system using a combination of cylinder deactivation, such as dynamic skip-fire, and intake-air throttling.

BACKGROUND

Many engines are coupled to exhaust aftertreatment systems that reduce harmful exhaust gas emissions (e.g., nitrous oxides (NOx), sulfur oxides, particulate matter, etc.). One or more components of the exhaust aftertreatment system, such as a selective catalytic reduction (SCR) system, may be most effective at elevated operating temperatures. In some operating conditions, such as a low load operating condition or a cold start operating condition, one or more of the components of the exhaust aftertreatment system may operate at a lower temperature and have diminished efficacy.

SUMMARY

One embodiment relates to a system including an exhaust aftertreatment system in exhaust gas receiving communication with an engine and a controller coupled to the engine and the exhaust aftertreatment system. The exhaust aftertreatment system includes a selective catalytic reduction system. The controller is configured to: receive a first temperature value associated with the exhaust aftertreatment system and a second temperature value associated with the engine; determine, based on comparing the first temperature value to a first threshold, a thermal management mode, wherein the thermal management mode includes a first thermal management mode or a second thermal management mode; determine, responsive to determining the thermal management mode and based on comparing the second temperature value to a second threshold, an operating mode for the thermal management mode, wherein the operating mode includes at least one of a first operating mode or a second operating mode; and initiate the at least one of the first or the second operating mode.

Another embodiment relates to a method. The method includes: receiving a first temperature value associated with an exhaust aftertreatment system and a second temperature value associated with an engine; determining, based on comparing the first temperature value to a first threshold, a thermal management mode, the thermal management mode including one of a first thermal management mode or a second thermal management mode; determining, responsive to determining the thermal management mode and based on comparing the second temperature value to a second threshold, an operating mode for the determined one of the first thermal management mode or the second thermal management mode, the operating mode comprising at least one of a first operating mode or a second operating mode; and initiating the at least one of the first operating mode or the second operating mode.

Yet another embodiment relates to a system structured to enable a thermal management mode for an engine system. The system includes a processor and a memory coupled to the processor, the memory storing instructions therein that, when executed by the processor, cause operations comprising: receiving a first temperature value associated with an exhaust aftertreatment system of the engine system and a second temperature value associated with an engine of the engine system; determining, based on comparing the first temperature value to a first threshold, a thermal management mode; determining, an operating mode based on determining the thermal management mode and based on comparing the second temperature value to a second threshold; and initiating the operating mode with the engine system.

Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

DETAILED DESCRIPTION

Figure 1:
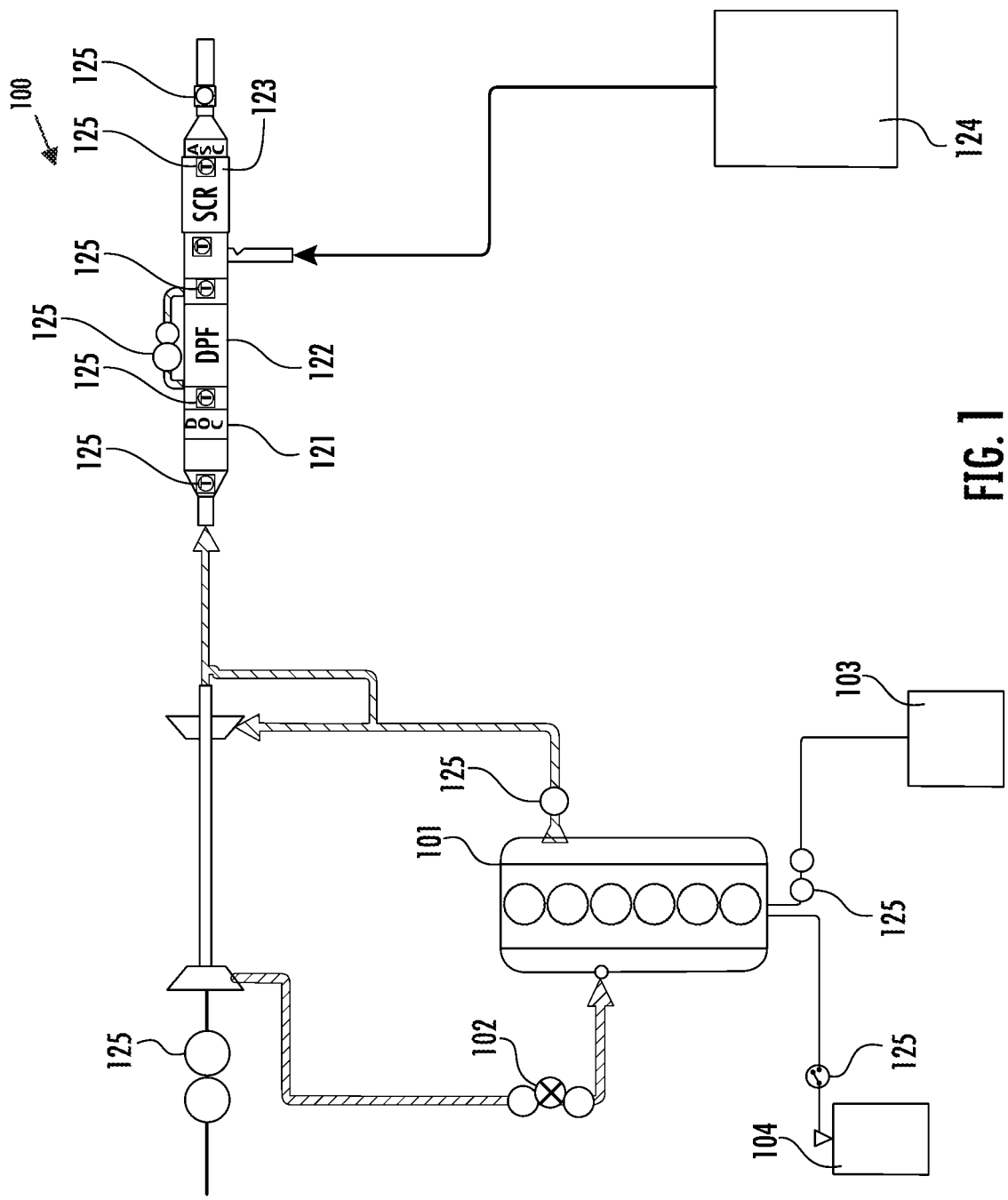
FIG. 1 is a schematic view of a block diagram of a vehicle system, according to an example embodiment.

Following below are more detailed descriptions of various concepts related to, and implementations of, methods, apparatuses, and systems for thermal management of an aftertreatment system using cylinder deactivation, such as dynamic skip-fire, and/or intake-air throttling. Before turning to the Figures, which illustrate certain exemplary embodiments in detail, it should be understood that the present disclosure is not limited to the details or methodology set forth in the description or illustrated in the Figures. It should also be understood that the terminology used herein is for the purpose of description only and should not be regarded as limiting.

As used herein a "parameter," "parameter value," and similar terms, in addition to the plain meaning of these terms, refer to an input, output, or other value associated with a component of the systems described herein. For example, a parameter may include a sensor value detected by an actual sensor or determined by a virtual sensor. A parameter may include a value, control setting, or other control signal used by a control system to control one or more components of the systems described herein. Thus, a parameter may include data or information.

As used herein "enthalpy" refers to a thermodynamic quantity equivalent to the total or approximately total heat content of a system. The enthalpy of a system is equal or approximately equal to the internal energy of the system plus the product of pressure and volume. The internal energy of the system is related to the heat transferred to the system and the thermodynamic work done by the system. In the context of the instant application, the pressure, volume and thermodynamic work of the system may be substantially constant, and the heat transfer may change dynamically as a result of changing engine operating conditions.

As described herein, an engine system may include an engine and an exhaust aftertreatment system in exhaust gas receiving communication with the engine. The exhaust aftertreatment system may include one or more components, such as a particulate filter configured to remove particulate matter, such as soot, from exhaust gas flowing in the exhaust gas conduit system, a dosing module (e.g., a doser) configured to supply a dosing fluid to the exhaust gas flowing in the exhaust gas system, and one or more catalyst devices configured to facilitate conversion of the exhaust gas constituents (e.g., nitrogen oxides, NOR) to less harmful elements (e.g., water, nitrogen), such as a diesel oxidation catalyst, a selectively catalytic reduction (SCR) system, a three-way catalyst, and so on. A control system or controller may monitor one or more parameters of the components of the engine system using one or more sensors (e.g., actual sensors and/or virtual sensors) to collect and/or determine sensor data. The control system may analyze the sensor data and compare the analyzed sensor data with one or more thresholds. The control system may determine a thermal management mode based on the analyzed sensor data exceeding a maximum threshold, being below a minimum threshold, or otherwise not falling with a desired/acceptable range. The control system may initialize a thermal management mode to adjust the temperature of one or more components of the aftertreatment system, where the one or more components are preferably one or more catalysts (e.g., a SCR catalyst).

Technically and beneficially, the systems, methods, and apparatuses described herein provide an improved control system that uses sensor data to determine a thermal management mode for the engine system. The control system described herein advantageously utilizes a particular control strategy to determine one or more parameters of one or more thermal management modes to satisfy one or more target operating conditions, such as a NOx conversion target (e.g., a target amount of NOx reduced by the SCR or aftertreatment system generally) and/or a target fuel efficiency (e.g., fuel consumption per unit distance, distance per unit fuel, etc.). That is, the systems and methods described herein provide a technical solution to the technical problem of enabling a thermal management mode for an engine system by using a particular computer-based process that advantageously optimizes for both aftertreatment efficiency and fuel efficiency. Advantageously, the thermal management mode is enabled automatically (e.g., without user input).

In an example scenario, a control system (e.g., a controller, a vehicle controller, etc.) utilizes one or more sensors (e.g., real sensors and/or virtual sensors) to detect one or more operating parameters of an engine system. The one or more operating parameters may include an engine load condition (e.g., low load, high load, medium load, another load value, etc.), an engine temperature (e.g., an engine air inlet temperature, an engine exhaust temperature, an engine oil temperature, etc.), an aftertreatment system temperature (e.g., a aftertreatment system component temperature, an aftertreatment system inlet temperature, an aftertreatment system exhaust temperature, etc.), and so on. The aftertreatment system component may include a particulate filter, a selective catalytic reduction (SCR) system, a diesel oxidation catalyst, etc. The control system may analyze the sensor data collected and/or generated by the one or more sensors. Analyzing the sensor data may include using one or more of a lookup table or a statistical model (e.g., a regression model, a machine learning model, etc.), or comparing the one or more parameters with a respective threshold. The control system may determine, based on the comparison (such as a parameter exceeding a respective maximum threshold or a parameter being below a minimum threshold), one or more parameters for a thermal management mode. The control system may initialize the thermal management mode based on the one or more determined parameters. The thermal management mode may include a "keep warm" (referred to herein as a first thermal management mode) or a "warm up" mode (referred to herein as a second thermal management mode). The first thermal management mode and/or the second thermal management mode may include a sub-thermal management or operating modes including one or more of a cylinder deactivation (CDA) mode (referred to herein as a first operating mode) and/or an intake-air throttle (IAT) mode (referred to herein as a second operating mode).

A cylinder deactivation (CDA) mode is a broad term that encompasses various related but distinct cylinder deactivation operating modes. A first type of CDA operating mode is known as "fixed cylinder CDA." In a fixed cylinder CDA operating mode, the same cylinder(s) are active/inactive each engine cycle during the fixed cylinder CDA operating mode. A second type of CDA operating mode is known as "skip-fire" or "dynamic skip-fire" (DSF) operating mode. In a DSF CDA mode, one or more cylinders are deactivated/inactive (e.g., combustion does not occur) on a cycle-by-cycle basis. Accordingly, a cylinder may be inactive for a first engine cycle and active for a second engine cycle. An "active" cylinder means that combustion is allowed to occur in that cylinder. An "inactive" or "deactivated" cylinder means that combustion is not allowed to occur in that cylinder. The present disclosure is applicable with each type of CDA operating mode, and the term CDA mode or CDA operating mode is meant to encompass all such operating modes unless indicated otherwise.

As used herein and in one embodiment, the phrase "firing fraction" as used with respect to the cylinders of an engine and the CDA/DSF operating mode refers to the number of cylinders active as a fraction of the total number of cylinders available. For example and in this embodiment, a firing fraction of 4/6 refers to four cylinders being active out of a total of six cylinders. In another embodiment, "firing fraction" refers to the times the cylinders are fired divided by the number of firing opportunities (e.g., number of engine cycles multiplied by the number of cylinders in the engine). For example, if a 6-cylinder engine is fired 9 times in 3 engine cycles, the firing fraction is 9/18 or ½. Firing fraction adjustments allow for the number of cylinders being fired (on average) to be modified by a fractional amount instead of a whole number. For example, a firing fraction may change from ⅓ to ⅖ which is equivalent to, in a 6-cylinder engine, increasing from 2 cylinders to 2.4 cylinders.

In some embodiments, using a DSF mode may result in "skip loss" heat transfer. As used herein "skip loss" refers to heat transfer (e.g., by conduction and/or convection) caused by ambient air being trapped in a deactivated (or unfired) cylinder. The ambient air may be cooler than the surrounding cylinder(s), which then causes heat transfer from the cylinder(s) to the cooler air in the cylinder. Furthermore, some of the ambient air may escape the cylinder(s) resulting in "blow-by" gases. As used herein "blow-by" gases refer to gases (e.g., air, air-fuel mixture, etc.) that leak between a piston and a cylinder wall of a cylinder and into a crankcase of the engine. The "blow-by" gases may cause additional heat transfer from the cylinder(s). In some embodiments, the blow-by gases may originate from an active cylinder or a deactivated cylinder. Further, if the ambient air is released from the deactivated cylinder, the ambient air may mix with the exhaust gas from an active (or fired) cylinder, thereby lowering the temperature of the exhaust gases. Skip loss heat transfer may reduce the fuel economy of the engine. Accordingly, the systems and methods described herein advantageously utilize a combination of CDA (e.g., DSF) and IAT operating modes. For example, to keep the engine (and components thereof) warm, the systems and methods described herein advantageously activate an IAT mode to adjust the amount of ambient air entering the cylinders (e.g., the "charge flow"). More specifically, an IAT mode may reduce the charge flow to a deactivated cylinder to mitigate against skip loss heat transfer.

In an IAT mode, an IAT valve of an engine may be adjusted to change the amount of ambient or charge air received by the engine. For example, the IAT value may be closed or at least partially closed to reduce the amount of ambient air received by one or more cylinders of the engine. In some embodiments, the ambient air may be retained in an air intake or air intake channel portion of the engine. Beneficially, by reducing the amount of ambient air and/or retaining at least a portion of the ambient air, the ambient air is not mixed with the exhaust gas. Accordingly, the IAT mode may enable higher exhaust gas temperatures by reducing skip loss heat transfer. Further, by reducing the amount of air received by active cylinders, an air-to-fuel ratio (AFR) within the active cylinder is reduced. Higher AFRs may correspond to a higher combustion temperature (i.e., lean conditions), thereby increasing the temperature of the exhaust gases.

Figure 2:
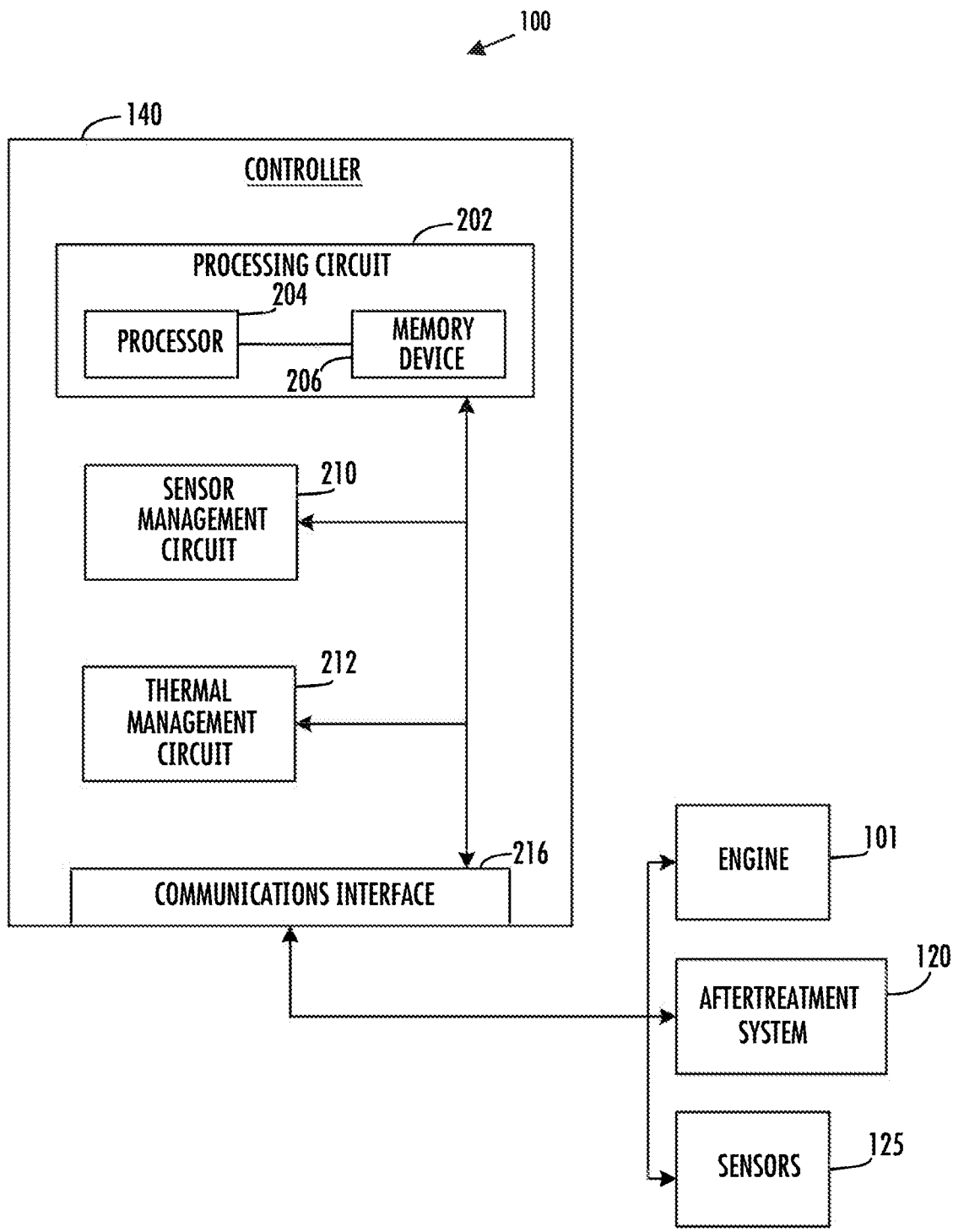
FIG. 2 is a block diagram of the controller of FIG. 1, according to an example embodiment.

Now referring to FIG. 1, a schematic view of a block diagram of a vehicle system 100 is shown, according to an example embodiment. The system 100 includes an engine 101, an aftertreatment system 120 in exhaust gas receiving communication with the engine 101. The system 100 may also include a controller 140 (as shown in FIG. 2) and an operator input/output (I/O) device (not shown), where the controller 140 is communicably coupled to each of the aforementioned components. In the configuration of FIG. 1, the system 100 is included in a vehicle. The vehicle may be any type of on-road or off-road vehicle including, but not limited to, wheel-loaders, fork-lift trucks, line-haul trucks, mid-range trucks (e.g., pick-up truck, etc.), sedans, coupes, tanks, airplanes, boats, and any other type of vehicle. In another embodiment, the system 100 may be embodied in a stationary piece of equipment, such as a power generator or genset. All such variations are intended to fall within the scope of the present disclosure.

The engine 101 may be any type of internal combustion engine that generates exhaust gas, such as a gasoline, natural gas, or diesel engine, and/or any other suitable engine. In the example depicted, the engine 101 is a part of a diesel engine system. In other embodiments, the engine 101 is part of a hybrid engine system having a combination of an internal combustion engine and at least one electric motor coupled to at least one battery. In some embodiments, the hybrid engine system may be configured as a mild-hybrid powertrain, a parallel hybrid powertrain, a series hybrid powertrain, or a series-parallel powertrain.

As shown in FIG. 1, an intake air throttle (IAT) valve 102, a fuel module 103, and an oil system 104 are coupled to the engine 101. The IAT valve 102 is structured to control an amount of air supplied to the engine 101. The fuel module 103 is structured to provide fuel to the engine 101 (e.g., from a fuel source). The fuel module 103 may control one or more fueling parameters including a fuel amount, a fuel pressure, a fuel injection timing, etc. The oil system 104 is configured to provide lubricant (e.g., lubricant oil) to the engine 101.

The IAT valve 102 is a valve positioned at an air inlet of the engine 101. The IAT valve 102 may be actuated (e.g., by an actuator controlled by the controller 140) between an open position and a closed position. In the open position, the IAT valve 102 allows a maximum amount of air to flow from the air intake to the engine 101. In the closed position, the IAT valve 102 allows a minimum amount of air to flow from the air intake to the engine 101. The controller 140 may selectively actuate the IAT valve 102 (e.g., by controlling the actuator) in a plurality of positions between and/or including the open position and the closed position to adjust the amount of air received by the engine 101.

The aftertreatment system 120 is in exhaust-gas receiving communication with the engine 101. In the example depicted, the aftertreatment system includes a diesel oxidation catalyst (DOC) 121, a diesel particulate filter (DPF) 122, and a selective catalytic reduction (SCR) system 123. In some embodiments, the aftertreatment system 120 includes an ammonia slip catalyst (ASC) (not shown). The DOC 121, the DPF 122, and the SCR 123 may be fluidly coupled by an exhaust gas conduit. The DOC 121 is structured to receive the exhaust gas from the engine 110 and to oxidize one or more exhaust gas constituents (e.g., hydrocarbons, carbon monoxide, etc.) in the exhaust gas. The DPF 122 is arranged or positioned downstream of the DOC 121 and structured to remove particulates or particulate matter, such as soot, from exhaust gas flowing in the exhaust gas stream. The DPF 122 includes an inlet, where the exhaust gas is received, and an outlet, where the exhaust gas exits after having particulate matter substantially filtered from the exhaust gas. In some implementations, the DPF 122 or other components may be omitted and/or other components added (e.g., a second SCR system having an additional dosing unit or module, multiple DOCs, etc.). Additionally, although a particular arrangement is shown for the aftertreatment system 120 in FIG. 1, the arrangement of components within the aftertreatment system 120 may be different in other embodiments (e.g., the DPF 122 positioned downstream of the SCR 123 and ASC).

The aftertreatment system 120 may further include a reductant delivery system which may include a decomposition chamber (e.g., decomposition reactor, reactor pipe, decomposition tube, reactor tube, etc.) to convert a reductant into ammonia, shown as a dosing module or unit 124. The reductant may be, for example, urea, diesel exhaust fluid (DEF), Adblue®, a urea water solution (UWS), an aqueous urea solution (e.g., AUS32, etc.), and other similar fluids. The dosing module 124 may include a reservoir, a pump, and a nozzle (and potentially other components or devices).

The reservoir may be structured to store the reductant. The pump may be fluidly coupled to the reservoir and the nozzle by a dosing conduit and structured to pump the reductant from the reservoir to the nozzle. The nozzle may provide the reductant to the exhaust gas within the exhaust gas conduit. The reductant fluid is added to the exhaust gas stream to aid in the catalytic reduction. As shown in FIG. 1, the reductant may be injected upstream of the SCR 123 generally (or in particular, the SCR catalyst) by the dosing module 124 such that the SCR catalyst receives a mixture of the reductant and exhaust gas. The reductant droplets then undergo the processes of evaporation, thermolysis, and hydrolysis to form gaseous ammonia within the decomposition chamber, the SCR catalyst, and/or the exhaust gas conduit system, which leaves the aftertreatment system 120.

As indicated above, the aftertreatment system 120 may further include an oxidation catalyst (e.g., the DOC 121) fluidly coupled to the exhaust gas conduit system to oxidize one or more gas constituents (e.g., hydrocarbons, carbon monoxide, etc.) of the exhaust gas. In order to properly assist in this reduction, the DOC 121 may be required to be at a certain operating temperature. In some embodiments, this certain operating temperature is approximately between 200-500° C. In other embodiments, the certain operating temperature is the temperature at which the conversion efficiency of the DOC 121 exceeds a predefined threshold (e.g. the conversion of HC to less harmful compounds, which is known as the HC conversion efficiency).

The SCR 123 is configured to assist in the reduction of NOx emissions by accelerating a NOx reduction process between the ammonia and the NOx of the exhaust gas into diatomic nitrogen ($N_2$) and water ($H_2O$). If the SCR catalyst is not at or above a certain temperature, the acceleration of the NOx reduction process is limited and the SCR 123 may not be operating at a level of a desired conversion efficiency (i.e., a value indicative of an amount of reduction of $NO_x$ emissions, also referred to as "$deNO_x$ efficiency"). In some embodiments, this certain temperature is approximately 200-600° C. The SCR catalyst may be made from a combination of an inactive material and an active catalyst, such that the inactive material (e.g. ceramic substrate) directs the exhaust gas towards the active catalyst, which is any sort of material suitable for catalytic reduction (e.g. metal exchanged zeolite (Fe or Cu/zeolite), base metals oxides like vanadium, molybdenum, tungsten, etc.).

When ammonia in the exhaust gas does not react with the SCR catalyst (either because the SCR 123 is below operating temperature or because the amount of dosed ammonia greatly exceeds the amount of NOR), the unreacted ammonia may bind to the SCR catalyst, becoming stored in the SCR 123. This stored ammonia is released from the SCR 123 as the SCR 123 warms, which can cause issues if the amount of ammonia released is greater than the amount of $NO_x$ passing through (i.e., more ammonia than needed for the amount of $NO_x$, which can lead to ammonia slip). In some embodiments, the ASC is included and structured to address ammonia slip by removing at least some excess ammonia from the treated exhaust gas before the treated exhaust gas is released into the atmosphere. As exhaust gas passes through the ASC, some of unreacted ammonia (i.e., unreacted with NOx) remaining in the exhaust gas is partially oxidized to NOx, which then consequently reacts with the remaining unreacted ammonia to form N2 gas and water. However, similar to the SCR catalyst, if the ASC is not at or above a certain temperature, the acceleration of the NH3 reduction process is limited and the ASC may not be operating at a level of efficiency to meet regulations or desired parameters. In some embodiments, this certain temperature is approximately 250-300° C.

As shown, a plurality of sensors 125 are included in the aftertreatment system 120. The number, placement, and type of sensors included in the aftertreatment system 120 is shown for example purposes only. That is, in other configurations, the number, placement, and type of sensors may differ. The sensors 125 may be gas constituent sensors (e.g., $NO_x$ sensors, oxygen sensors, etc.), temperature sensors, particulate matter (PM) sensors, flow rate sensors (e.g., mass flow rate sensors, volumetric flow rate sensors, etc.), other exhaust gas emissions constituents sensors, pressure sensors, some combination thereof, and so on. The gas constituent sensors may include an oxygen sensor that is structured to acquire data indicative of the presence of oxygen in the exhaust gas. The data from the oxygen sensor may be used to estimate an AFR value. The flow rate sensors may include a mass air flow (MAF) sensor structured to acquire data indicative of a mass flow rate of the exhaust gas. The temperature sensors are structured to acquire data indicative of a temperature value at each location that the temperature sensor is located.

The sensors 125 may be located in or proximate the engine 101, after the engine 101 and before the aftertreatment system 120, after the aftertreatment system 120, in the aftertreatment system as shown (e.g., coupled to the DPF and/or DOC, coupled to the SCR, etc.), upstream of the engine 101, etc. It should be understood that the location of the sensors may vary. In one embodiment, there may be sensors 125 located both before and after the aftertreatment system 120. In one embodiment, at least one of the sensors is structured as exhaust gas constituent sensors (e.g., CO, NOx, PM, SOx, etc. sensors). In another embodiment, at least one of the sensors 125 is structured as non-exhaust gas constituent sensors that are used to estimate exhaust gas emissions (e.g., temperature, flowrate, pressure, etc.). Additional sensors may be also included with the system 100. The sensors may include engine-related sensors (e.g., torque sensors, speed sensors, pressure sensors, flowrate sensors, temperature sensors, etc.). For example, in some embodiments, at least one of the sensors 125 is structured as an oil temperature sensor that is used to detect and/or determine an engine oil temperature. The sensors may further include sensors associated with other components of the vehicle (e.g., speed sensor of a turbo charger, fuel quantity and injection rate sensor, fuel rail pressure sensor, etc.).

The sensors 125 may be real or virtual (i.e., a non-physical sensor that is structured as program logic in the controller 140 that makes various estimations or determinations). For example, an engine speed sensor may be a real or virtual sensor arranged to measure or otherwise acquire data, values, or information indicative of a speed of the engine 101 (typically expressed in revolutions-per-minute). The sensor is coupled to the engine (when structured as a real sensor), and is structured to send a signal to the controller 140 indicative of the speed of the engine 101. When structured as a virtual sensor, at least one input may be used by the controller 140 in an algorithm, model, lookup table, etc. to determine or estimate a parameter of the engine (e.g., power output, etc.). Any of the sensors 125 described herein may be real or virtual.

The controller 140 is coupled and, particularly communicably coupled, to the sensors 125. Accordingly, the controller 140 is structured to receive data from one more of the sensors 125 and provide instructions/information to the one or more sensors 125. The received data may be used by the controller 140 to control one more components in the system 100 and/or for monitoring and thermal management purposes.

The operator input/output (I/O) device may be coupled to the controller 140, such that information may be exchanged between the controller 140 and the I/O device, where the information may relate to one or more components of FIG. 1 or determinations (described below) of the controller 140. The operator I/O device enables an operator of the system 100 to communicate with the controller 140 and one or more components of the system 100 of FIG. 1. For example, the operator input/output device may include, but is not limited to, an interactive display, a touchscreen device, one or more buttons and switches, voice command receivers, etc. In this way, the operator input/output device may provide one or more indications or notifications to an operator, such as a malfunction indicator lamp (MIL), etc. Additionally, the vehicle may include a port that enables the controller 140 to connect or couple to a scan tool so that fault codes and other information regarding the vehicle may be obtained.

The controller 140 is structured to control, at least partly, the operation of the system 100 and associated sub-systems, such as the engine 101 and the operator I/O device. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network (CAN) bus provides the exchange of signals, information, and/or data. The CAN bus includes any number of wired and wireless connections. Because the controller 140 is communicably coupled to the systems and components of FIG. 1, the controller 140 is structured to receive data from one or more of the components shown in FIG. 1. The structure and function of the controller 140 is further described in regard to FIG. 2.

As the components of FIG. 1 are shown to be embodied in the system 100, the controller 140 may be structured as one or more electronic control units (ECUs), such as one or more microcontrollers. The controller 140 may be separate from or included with at least one of a transmission control unit, an exhaust aftertreatment control unit, a powertrain control module, an engine control module, etc.

Now referring to FIG. 2, a schematic diagram of the controller 140 of the system 100 of FIG. 1 is shown, according to an example embodiment. As shown, the controller 140 includes at least one processing circuit 202 having at least one processor 204 and at least one memory device 206, a sensor management circuit 210, a thermal management circuit 212, and a communications interface 216. The controller 140 is structured to monitor the engine 101 and the aftertreatment system 120 and enable a thermal management mode based on monitoring the engine and/or the aftertreatment system 120. The thermal management mode may be defined by a thermal management mode and an operating mode. As briefly described above, the thermal management mode may include one of a first thermal management mode or a second thermal management mode. Accordingly, the controller 140 may determine whether to enable the first thermal management mode or the second thermal management mode. Further, each of the first thermal management mode and the second thermal management mode may include a first operating mode, a second operating mode, or both of the first and second operating modes. Accordingly, the controller 140 may determine whether to enable the first operating mode, the second operating mode, or both the first and second operating modes. Enabling the first thermal management mode, the second thermal management mode, or the first and second operating modes causes the engine system (e.g., the engine 101 and/or the aftertreatment system 120) to operate such that the engine 101 and/or the aftertreatment system 120 operates at a target output (e.g., a target exhaust gas temperature, a target component temperature, a target fuel efficiency, etc.).

In one configuration, the sensor management circuit 210 and/or the thermal management circuit 212 are embodied as machine or computer-readable media storing instructions that are executable by a processor, such as processor 204. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media instructions may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the sensor management circuit 210 and/or the thermal management circuit 212 are embodied as hardware units, such as one or more electronic control units. As such, the sensor management circuit 210 and/or the thermal management circuit 212 may be embodied as one or more circuitry components including, but not limited to, processing circuitry, network interfaces, peripheral devices, input devices, output devices, sensors, etc. In some embodiments, the sensor management circuit 210 and/or the thermal management circuit 212 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the sensor management circuit 210 and/or the thermal management circuit 212 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on. The sensor management circuit 210 and/or the thermal management circuit 212 may also include or be programmable hardware devices such as field programmable gate arrays, programmable array logic, programmable logic devices or the like. The sensor management circuit 210 and/or the thermal management circuit 212 may include one or more memory devices for storing instructions that are executable by the processor(s) of the sensor management circuit 210 and/or the thermal management circuit 212. The one or more memory devices and processor(s) may have the same definition as provided below with respect to the memory device 206 and processor 204. In some hardware unit configurations, the sensor management circuit 210 and/or the thermal management circuit 212 may be geographically dispersed throughout separate locations in the vehicle. Alternatively and as shown, sensor management circuit 210 and/or the thermal management circuit 212 may be embodied in or within a single unit/housing, which is shown as the controller 140.

In the example shown, the controller 140 includes the processing circuit 202 having the processor 204 and the memory device 206. The processing circuit 202 may be structured or configured to execute or implement the instructions, commands, and/or control processes described herein with respect to the sensor management circuit 210 and/or the thermal management circuit 212. The depicted configuration represents sensor management circuit 210 and/or the thermal management circuit 212 being embodied as machine or computer-readable media storing instructions. However, as mentioned above, this illustration is not meant to be limiting as the present disclosure contemplates other embodiments where the sensor management circuit 210 and/or the thermal management circuit 212, or at least one circuit of the sensor management circuit 210 and/or the thermal management circuit 212, is configured as a hardware unit. All such combinations and variations are intended to fall within the scope of the present disclosure.

The processor 204 may be implemented as one or more single- or multi-chip processors, digital signal processors (DSPs), application specific integrated circuits (ASICs), field programmable gate arrays (FPGAs), and/or suitable processors (e.g., other programmable logic devices, discrete hardware components, etc. to perform the functions described herein). A processor may be a microprocessor, a group of processors, etc. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., the sensor management circuit 210 and/or the thermal management circuit 212 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device 206 (e.g., memory, memory unit, storage device) may include one or more devices (e.g., RAM, ROM, Flash memory, hard disk storage) for storing data and/or computer code for completing or facilitating the various processes, layers and modules described in the present disclosure. For example, the memory device 206 may include dynamic random-access memory (DRAM). The memory device 206 may be communicably connected to the processor 204 to provide computer code or instructions to the processor 204 for executing at least some of the processes described herein. Moreover, the memory device 206 may be or include tangible, non-transient volatile memory or non-volatile memory. Accordingly, the memory device 206 may include database components, object code components, script components, or any other type of information structure for supporting the various activities and information structures described herein.

The communications interface 216 may include any combination of wired and/or wireless interfaces (e.g., jacks, antennas, transmitters, receivers, transceivers, wire terminals) for conducting data communications with various systems, devices, or networks structured to enable in-vehicle communications (e.g., between and among the components of the vehicle) and out-of-vehicle communications (e.g., with a remote server). For example and regarding out-of-vehicle/system communications, the communications interface 216 may include an Ethernet card and port for sending and receiving data via an Ethernet-based communications network and/or a Wi-Fi transceiver for communicating via a wireless communications network. The communications interface 216 may be structured to communicate via local area networks or wide area networks (e.g., the Internet) and may use a variety of communications protocols (e.g., IP, LON, Bluetooth, ZigBee, radio, cellular, near field communication).

The sensor management circuit 210 is structured or configured to control the operation of the sensors 125. For example, the sensor management circuit 210 may be structured to generate one or more control signals and transmit the control signals to one or more sensors 125 (e.g., to acquire data, etc.). The control signals may cause the one or more sensors 125 to sense and/or detect the sensor data and/or provide the sensor data to the sensor management circuit 210. In some embodiments, the sensor management circuit 210 may be structured to estimate the sensor data (e.g., when the sensors 125 are virtual sensors). The "sensor data" may include temperature data (e.g., fluid temperature such as exhaust gas temperature or engine oil temperature, component temperature such as engine temperature, etc.), flow rate data (e.g., exhaust gas flow rate data, charge air flow rate, etc.), pressure data (e.g., engine cylinder pressure, coolant pressure, etc.), and/or other data related to the operation of the system 100.

The thermal management circuit 212 is structured to control, at least partly, operation of the engine 101. For example, the thermal management circuit 212 may be structured to enable a thermal management mode for the aftertreatment system 120. For example, the thermal management mode may cause the engine to operate in the CDA (e.g., DSF) mode and/or the TAT mode, based on, for example, one or more engine operating conditions. In some embodiments, the thermal management circuit 212 may be structured to disable a thermal management mode and/or prevent a thermal management mode from being enabled based on, for example, one or more engine operating conditions.

As mentioned above, the thermal management mode may include a "warm up" mode (e.g., a first thermal management mode) or a "keep warm" mode (e.g., a second thermal management mode). The warm up mode and the keep warm mode are described herein with respect to FIG. 3. The thermal management circuit 212 may determine to activate or initiate the first thermal management mode or the second thermal management mode. Subsequent to determining that the thermal management mode is the first thermal management mode, the thermal management circuit 212 may determine whether the first thermal management mode includes the CDA (e.g., DSF) mode (e.g., the first operating mode) or the TAT mode (e.g., the second operating mode). Subsequent to determining that the thermal management mode is the second thermal management mode, the thermal management circuit 212 may determine whether the second thermal management mode includes the CDA (e.g., DSF) mode (e.g., the first operating mode), the TAT mode (e.g., the second operating mode), or both the CDA mode and the TAT mode. The thermal management circuit 212 may additionally determine a parameter for the CDA (e.g., DSF) mode (referred to herein as a "CDA mode parameter" or "DSF mode parameter(s)" when referring to DSF mode specifically). In either the first thermal management mode or the second thermal management mode and subsequent to or as part of determining that the thermal management mode includes the TAT mode, the thermal management circuit 212 may determine a parameter for the TAT mode (referred to herein as an "TAT mode parameter"). When the determined thermal management mode includes the CDA (e.g., DSF) mode, the thermal management circuit 212 may be structured to selectively and dynamically deactivate one or more cylinders of the engine 101. With reference to DSF, the thermal management circuit 212 may determine one or more parameters of the DSF mode, such as a duration of the DSF mode (e.g., number of cycles, time period, etc. for the DSF) and/or a firing pattern for the DSF mode. In an example embodiment, the thermal management circuit 212 may determine a firing fraction that corresponds to a particular thermal output (e.g., a temperature target, an enthalpy target, etc.). Examples of thermal output based on the firing fraction as shown in FIGS. 4A and 4B. The "firing fraction" DSF mode parameter is described herein above.

When the thermal management mode includes the IAT mode, the thermal management circuit 212 may be structured to selectively adjust the IAT valve 102. Accordingly, as part of the IAT operating mode, the controller 140 may be structured to determine one or more parameters of the IAT mode (referred to herein as "IAT mode parameters"), such as duration of the IAT mode (e.g., number of cycles, time period, etc.) and/or a throttle position of the IAT valve 102. The throttle position may define a throttle position for the IAT valve 102. The throttle position may be defined between an open position and a closed position, inclusive. In some embodiments, the thermal management circuit 212 may be structured to adjust the intake air throttle valve 102 for the engine 101 by an actuator that actuates the IAT valve 102 between the open position and the closed position. In some embodiments, a sensor 125 is included as an IAT valve sensor 125 that is structured to detect and/or determine a position of the IAT valve and provide feedback to the thermal management circuit 212 (or, controller more generally). In some embodiments, the engine 101 includes at least one air intake valve for each cylinder of the engine 101, and the thermal management circuit 212 is structured to adjust the air intake valve for each cylinder of the engine 101, similar to the IAT valve 102 as part of the IAT mode.

In some embodiments, the controller 140, or a component thereof (e.g., the thermal management circuit 212), may determine whether to enable the first thermal management mode or the second thermal management mode, and the first operating mode and/or the second operating mode, based on a desired range for a target temperature of the exhaust gas (and/or a target temperature of one or more components of the aftertreatment system 120) and/or a desired range for a target fuel efficiency. For example, the controller 140 may use at least one of a lookup table or a statistical model to determine one or more CDA mode parameters and/or IAT mode parameters that correspond to a desired deNOx target, temperature target, and/or fuel efficiency target. For example, the controller 140 may apply the CDA mode parameters and/or the IAT mode parameters to the first operating mode and/or the second operating mode, respectively, to achieve a target temperature, deNOx efficiency, and/or fuel efficiency. In this way, the controller 140 may optimize the thermal management mode to achieve target operating conditions (e.g., the target deNOx, target temperature and/or target fuel efficiency).

The controller 140 may compare sensor data that includes one or more operational parameter values with a respective threshold to determine the CDA mode parameters and/or the IAT mode parameters. For example, when the controller 140 determines that the thermal management mode includes at least the CDA (e.g., DSF) mode, controller 140 determines one or more corresponding DSF parameters, such as DSF duration and/or a DSF firing pattern. When the controller 140 determines that the thermal management mode includes at least an IAT mode, controller 140 determines one or more corresponding IAT parameters, such as IAT duration and/or an IAT throttle position. The logic used to determine the CDA mode parameters and/or the IAT mode parameters is described in more detail herein with respect to FIG. 3.

Figure 3:
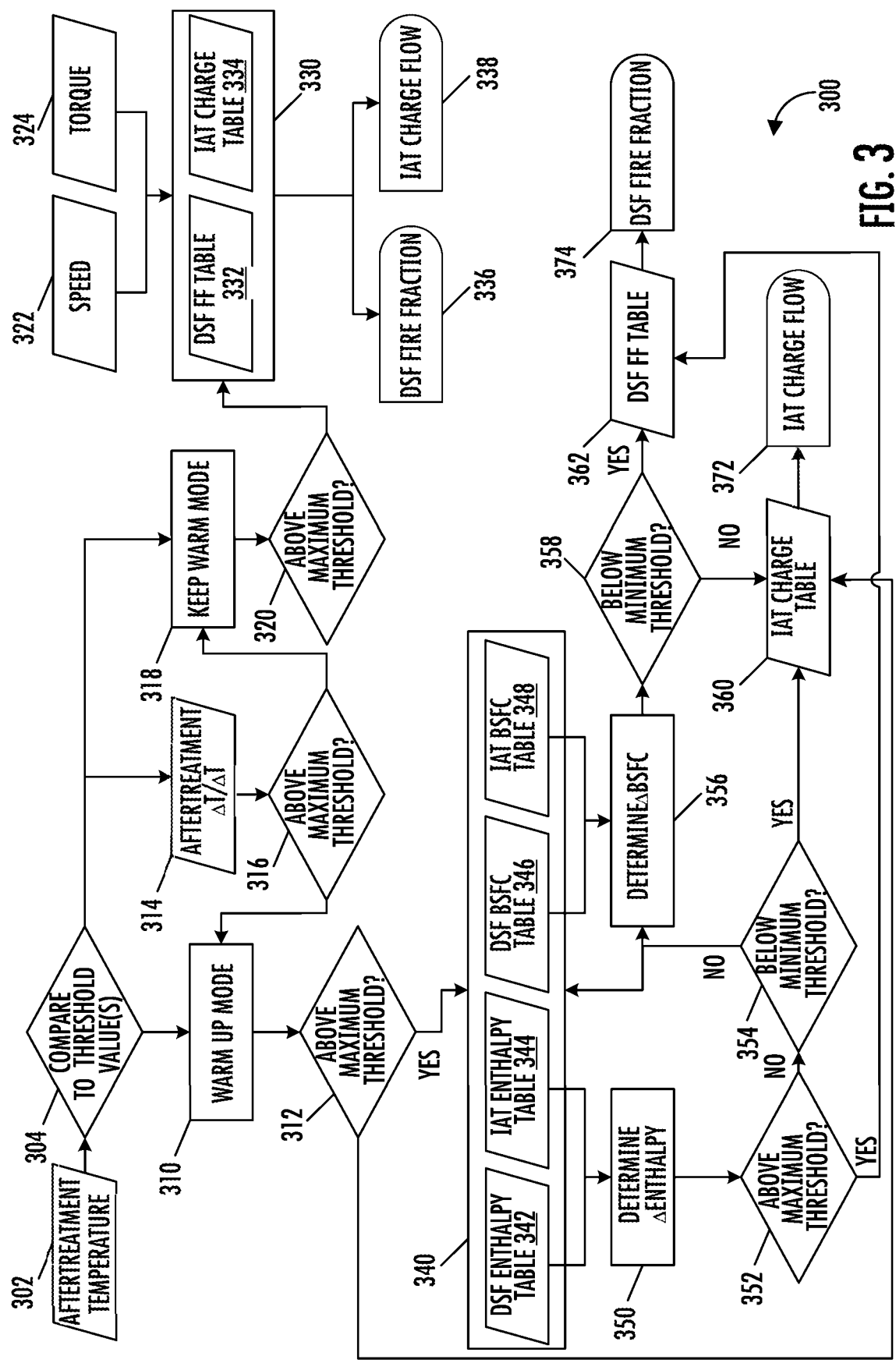
FIG. 3 is a flow diagram of a method of monitoring and controlling an operating temperature of the exhaust aftertreatment system of FIG. 1, according to an example embodiment.
Figure 4A:
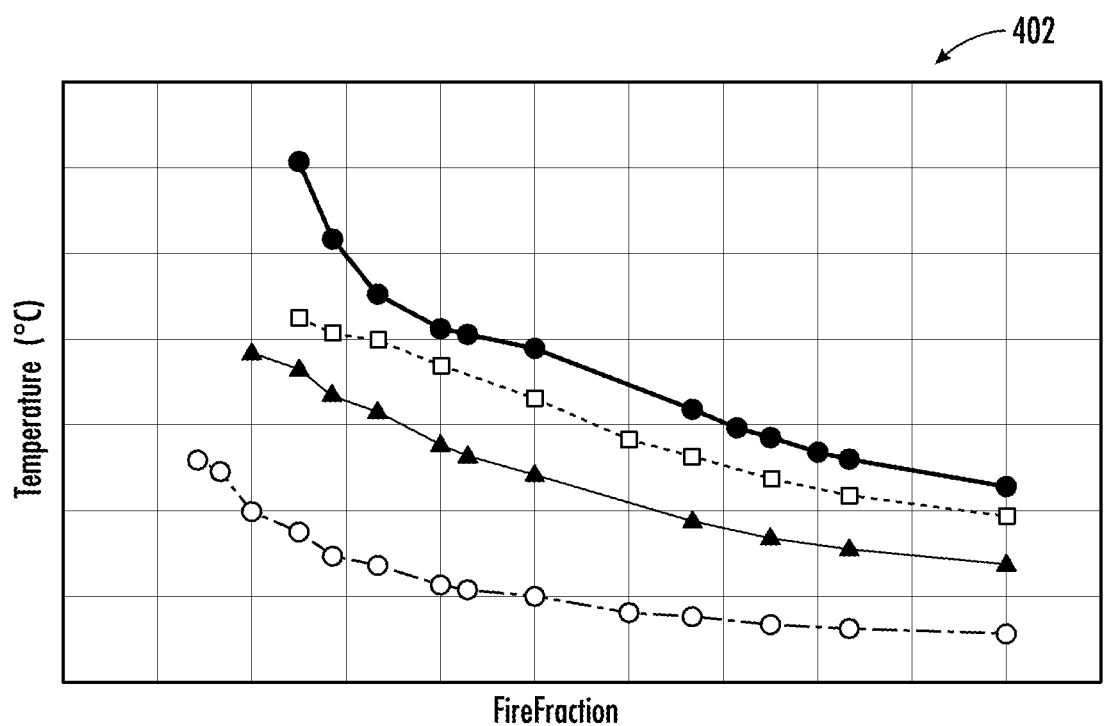
FIG. 4A is a diagram representing a relationship between firing fraction and thermal output, according to an example embodiment.
Figure 4B:
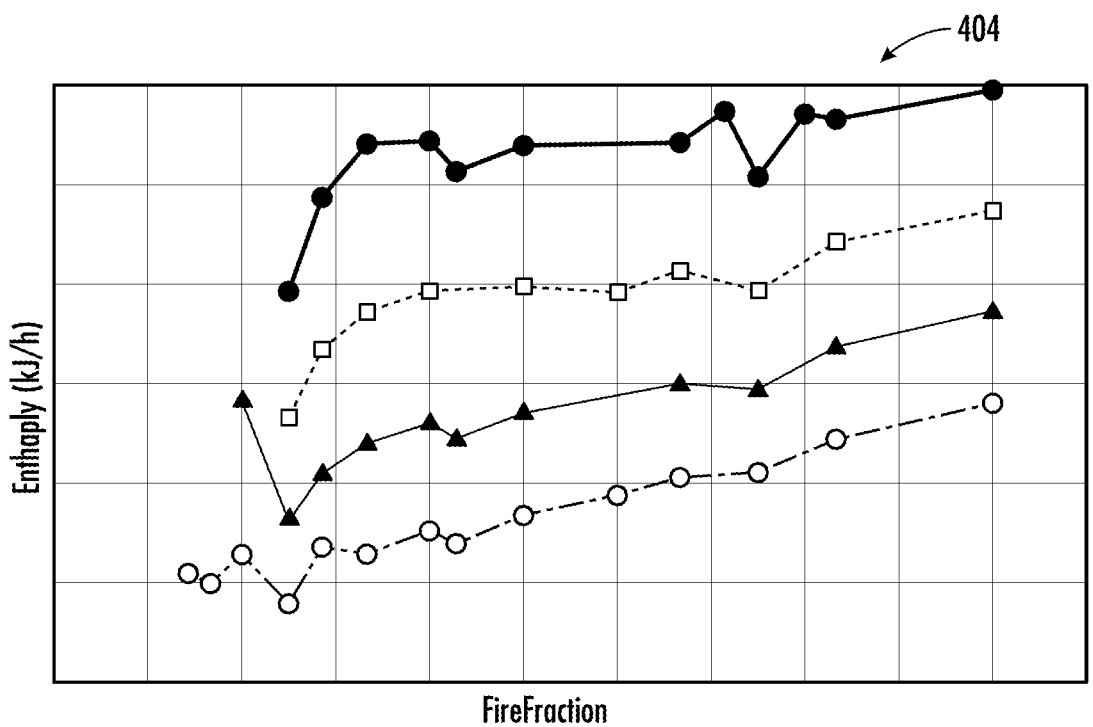
FIG. 4B is a diagram representing a relationship between firing fraction and thermal output, according to another example embodiment.

FIG. 3 is a flow diagram of a method 300 of monitoring and controlling an operating temperature of the exhaust aftertreatment system of FIG. 1, according to an example embodiment. The controller 140 is structured to determine a thermal management mode based on one or more inputs and using one or more of a lookup table or a statistical model (e.g., a regression model, a machine learning model such as artificial intelligence including neural networks, etc.).

As a high level overview of the method 300, the controller 140 may determine a thermal management mode. As described herein, the thermal management mode may include the warm up mode (e.g., the first thermal management mode) or the keep warm mode (e.g., the second thermal management mode). The warm up mode is referred to as the first thermal management mode herein. The keep warm mode is referred to as the second thermal management mode herein. The warm up mode refers to a thermal management mode that is used to increase the temperature and/or increase the enthalpy of the exhaust gas and/or the aftertreatment system 120 and/or a component thereof, such as the SCR 123, to a target temperature value and/or a target enthalpy value. The keep warm mode refers to a thermal management mode that is used to maintain a desired temperature of the exhaust gas in the aftertreatment system 120 and/or of a component thereof (e.g., the SCR 123) within a desired temperature range.

After determining the thermal management mode, the controller 140 may determine an operating mode, operation, thermal process, or sub-thermal management modes, for the first or second thermal management modes. With respect to the warm up mode, the operating mode may be the CDA (e.g., DSF) mode (the first operating mode) or the IAT mode (the second operating mode). With respect to the keep warm mode, the operating mode is one or both of the CDA (e.g., DSF) mode and the IAT mode. Thus, enabling an operating mode (e.g., an operation, a process, a sub-thermal management mode, etc.) may include initiating a CDA (DSF) mode and/or an IAT mode.

It should be understood that the thermal management control processes, techniques, and strategies described herein may include other thermal management techniques in addition to the CDA and/or IAT operating modes described herein including, but not limited to, activation of exhaust gas heaters, engine speed/torque manipulations to affect exhaust gas temperatures, hydrocarbon dosing strategies (e.g., post-cylinder injections to cause exothermic reactions), and so on.

At process 302, the controller 140 receives a first parameter value. The first parameter value is shown as a temperature value of the aftertreatment system 120. In an example embodiment, the first parameter is a temperature value of the SCR 123 (e.g., an exhaust gas temperature at an inlet of the SCR 123, at the outlet of the SCR 123, or within the SCR 123, and/or a SCR bed temperature). In other embodiments, the first parameter may include a temperature value of the exhaust gas at a different location in the aftertreatment system 120 (e.g., at the DOC 121, the DPF 122, etc.). Thus, the first parameter value may be a first temperature value including a temperature of the SCR 123. The first parameter value may be received from one or more sensors 125. In some embodiments, the first parameter value is detected by a real sensor 125. In other embodiments, the first parameter value is a determined value that is estimated by a virtual sensor 125.

At process 304, the controller 140 compares the first parameter value to one or more first threshold values. The first threshold values may include a first minimum threshold and a first maximum threshold. In an example embodiment, the first minimum threshold may be approximately 220° C. and the first maximum threshold may be approximately 270° C. If the first parameter value is below the first minimum threshold value, the method 300 continues to process 310. If the first parameter value is above the first maximum threshold value, the method 300 continues to process 318. If the first parameter value is greater than the first minimum threshold value and less than the first maximum threshold value, the method 300 continues to process 314.

At process 310, the controller 140 determines that the thermal management mode is the warm up mode and initiates the warm up mode. The warm up mode refers to a thermal management mode that is used to increase the temperature and/or increase the enthalpy of the exhaust gas and/or the aftertreatment system 120 and/or a component thereof, such as the SCR 123, to a target temperature value and/or a target enthalpy value. As briefly described above, the controller 140 may determine that the thermal management mode is the warm up mode based on determining that the first parameter is below the first minimum threshold and/or, as described below, the third parameter is below the third maximum threshold value. The warm up mode may include a CDA (e.g., DSF) mode or an IAT mode. Accordingly, the controller 140 may determine whether the DSF mode or the IAT mode would or likely would achieve a thermal target (e.g., temperature target, enthalpy target). In some embodiments, the warm up mode may include the use of an electric heater to heat the exhaust gas in the aftertreatment system 120 and/or to heat a component of the aftertreatment system 120.

At process 312, the controller 140 compares a second parameter value to a second threshold. The second parameter value may be a temperature value regarding the engine 101. In an example embodiment, the second parameter is an oil temperature value, including a temperature of lubricant oil in the oil system 104 (e.g., the oil temperature at an oil sump, within the engine 101, and/or other locations within the oil system 104). The second parameter value may be received from one or more sensors 125. In some embodiments, the second parameter value is detected by a real sensor 125. In other embodiments, the second parameter value is a determined value that is estimated by a virtual sensor 125. The second threshold may be a maximum threshold. In an example embodiment, the second maximum threshold may be approximately 40° C. If the second parameter value is below the second maximum threshold value, the method 300 continues to process 360. For example, if a fluid temperature, and particularly the oil temperature is below 40° C. or approximately 40° C., the controller 140 determines that the warm up mode does not include the CDA (e.g., DSF) mode (the first thermal management mode does not include the first operating mode). Based on the second parameter value being below the second maximum threshold value, the controller 140 determines that the warm up mode includes the IAT mode (the first thermal management mode includes the second operating mode). Accordingly, the controller 140 proceeds to process 360 to determine one or more IAT mode parameters. If the second parameter value is above the second maximum threshold value, the method 300 continues to process 340. For example, if the oil temperature is above 40° C. or approximately 40° C. the controller 140 determines that the warm up mode may include the CDA (e.g., DSF) mode or the IAT mode (the first thermal management mode may include the first operating mode or the second operating mode). Accordingly, the controller 140 proceeds to process 340 to determine whether to use the CDA (DSF) mode or the IAT mode.

At process 314, the controller 140 determines a third parameter value. The third parameter value may include a change in temperature over time. In other embodiments, the third parameter value may be a change in temperature over a distance travelled by the system 100, a change in temperature over a predefined amount of engine cycles, a change in temperature over a predefined amount of cylinder firing events, etc. In some embodiments, the temperature value of the third parameter may include a temperature of the exhaust gas at the SCR 123 (e.g., at an inlet, outlet, or within the SCR 123) and/or a temperature of the SCR 123 component. In an example embodiment, the third parameter is a change in temperature of the SCR 123 over time. The third parameter value may be received from one or more sensors 125. In some embodiments, the third parameter value is detected by a real sensor 125. In other embodiments, the third parameter value is a determined value that is estimated by a virtual sensor 125. In some embodiments, the third parameter is determined by determining a difference between a maximum temperature value and a minimum temperature value within the predetermined time period.

At process 316, the controller 140 compares the third parameter value with a third threshold value. The third threshold may be a maximum threshold. In an example embodiment, the third maximum threshold may be approximately 0° C./s. If the third parameter value is below the third maximum threshold value (i.e., indicating a cooling or temperature drop regarding the component, such as the SCR), the method 300 continues to process 310. If the third parameter value is above the third maximum threshold value (i.e., indicating a heating or temperature increase regarding the component, such as the SCR), the method 300 continues to process 318.

At process 318, the controller 140 determines that the thermal management mode is the keep warm mode and initiates the keep warm mode. When the controller initiates the keep warm mode, the controller 140 activates certain temperature control devices to maintain a desired temperature of the exhaust gas in the aftertreatment system 120 and/or of a component thereof (e.g., the SCR 123). For example, the keep warm mode may be used to maintain or moderately increase the temperature of the exhaust gas in the aftertreatment system 120 and/or a component thereof, such as the SCR 123. As briefly described above, the controller 140 may determine to implement the keep warm mode based on determining that the first parameter is above the first minimum threshold and/or the third parameter is above the third maximum threshold value. The keep warm mode may include the CDA (DSF) mode and/or the IAT mode. Accordingly, the controller 140 may determine whether the CDA (or, DSF) mode, the IAT mode, or a combination thereof would achieve a thermal target (e.g., temperature target, enthalpy target) defined by the keep warm mode. In some embodiments, the keep warm mode may include the use of an electric heater to heat the exhaust gas in the aftertreatment system 120 and/or to heat a component of the aftertreatment system 120.

Thus, the controller 140 may be configured to determine that the thermal management mode is the keep warm mode or the warm up mode based on a first temperature value. The first temperature value may include at least one of the first parameter value or the third parameter value (e.g., the SCR component temperature, the exhaust gas temperature, or a change in temperature thereof over time).

At process 320, the controller 140 compares the second parameter value to the second threshold, as described above with respect to process 312. At process 320, if the second parameter value is at or above the second maximum threshold value, the method 300 continues to process 330. For example, if the oil temperature is above 40° C. or approximately 40° C., the controller 140 determines that the keep warm mode includes a CDA (DSF) operating mode and the IAT operating mode (i.e., the second thermal management mode may include the first and second operating modes). Accordingly, the controller 140 proceeds to process 330 to determine one or more CDA mode parameters and/or one or more IAT mode parameters. When both the CDA (DSF) mode and the IAT mode are active, the IAT mode advantageously reduces skip loss heat transfer that may be caused by the CDA (DSF) mode. If the second parameter value is below the second maximum threshold value, the method 300 may stop the method 300. For example, if the oil temperature is below 40° C. or approximately 40° C., the controller 140 determines to not activate the CDA (e.g., DSF) mode and/or the IAT mode. Thus, the controller 140 may not activate the CDA and the IAT operating modes based on determining that the second temperature value is below the second threshold. Accordingly, the controller 140 ends the method 300.

Thus, the controller 140 may be configured to determine the operating mode based on a second temperature value. The second temperature value may include the second parameter value (e.g., the oil temperature value).

At process 322, the controller 140 receives a fourth parameter value (e.g., an engine operating parameter). The fourth parameter value is shown as a speed value of the system 100. In an example embodiment, the fourth parameter is a speed of the engine 101 (e.g., an engine rotations per minute (RPM), a vehicle speed, a transmission speed, etc.). The speed may be measured instantaneously, or averaged over a predetermined period (e.g., a predetermined time period, a predetermined number of engine cycles, etc.). The fourth parameter value may be received from one or more sensors 125. In some embodiments, the fourth parameter value is detected by a real sensor 125. In other embodiments, the fourth parameter value is a determined value that is estimated by a virtual sensor 125.

At process 324, the controller 140 receives a fifth parameter value (e.g., an engine operating parameter). The fifth parameter value is shown as a torque value of the system 100. In an example embodiment, the fifth parameter is a torque output of the engine 101. The fifth parameter value may be received from one or more sensors 125. In some embodiments, the fifth parameter value is detected by a real sensor 125. In other embodiments, the fifth parameter value is a determined value that is estimated by a virtual sensor 125.

In some embodiments, the fourth parameter value and/or the fifth parameter value may be determined based on a load value and/or a power output of the engine 101. For example, the controller 140 may determine the fourth parameter value and/or the fifth parameter value based on data received from one or more sensors 125 (e.g., detected and/or determined by the sensors 125). More specifically, the fourth parameter value and/or the fifth parameter value may be determined based on the power value being equivalent to the speed multiplied by torque.

At process 330, the controller 140 determines one or more parameters for the operating mode. The controller 140 may determine that the keep warm mode includes the CDA (e.g., DSF) mode and the IAT mode (e.g., the second thermal management mode may include both of the first operating mode and the second operating mode). For example, when the controller 140 determines that the second parameter value is at or greater than the maximum threshold of the second parameter value at process 320, the controller 140 may determine that the keep warm mode includes a combination of the CDA (e.g., DSF) mode and the IAT mode. In the keep warm mode, activating the IAT mode in combination with the DSF mode advantageously reduces skip loss heat transfer by reducing the air flow to deactivated cylinders.

At process 330 and if DSF is activated in particular, the controller 140 may use one or more of a DSF fire fraction lookup table 332 and an IAT charge lookup table 334 to determine the one or more parameters (e.g., a DSF mode parameter and/or an IAT mode parameter). The controller 140 may use one or more parameter values (e.g., the fourth and fifth parameter values) as inputs for the DSF fire fraction lookup table 332 and/or the IAT charge lookup table 334. The controller 140 may use the inputs to determine the DSF mode parameters and/or the IAT mode parameters, described herein above. Accordingly, the DSF mode parameters and/or the IAT mode parameters (e.g., the DSF fire fraction and/or an IAT charge flow that corresponds to an IAT valve position) may be determined based on one or more engine operating parameters.

At process 336, the controller 140 outputs a DSF fire fraction command based on the DSF mode parameter determined at process 330. At process 338, the controller 140 outputs an IAT charge flow command based on the IAT mode parameter determined at process 330.

At process 340, the controller 140 determines one or more parameters for the operating mode (e.g., a CDA mode parameter such as a DSF mode parameter and/or an IAT mode parameter). The controller 140 may determine that the warm up mode includes the CDA and, particularly the DSF mode, or the IAT mode. In an example embodiment, the controller 140 may determine to use only one of the DSF mode and the IAT mode based on which mode will provide a greater increase in enthalpy, or, if the difference in enthalpy between the two modes is below a threshold value, which mode will provide a greater fuel efficiency. As described above, the CDA (e.g., DSF) mode may increase enthalpy by increasing the load on an individual cylinder (the activated cylinder(s)) which increases a combustion temperature of the individual cylinder, thereby increasing the exhaust gas temperature. The IAT mode may increase enthalpy by reducing an air to fuel ratio (AFR) to increase the exhaust gas temperature. For example, in some embodiments, the controller 140 may determine whether to use the CDA (e.g., DSF) mode or the IAT mode based on a predicted increase in enthalpy. Accordingly, the controller 140 may use a CDA (e.g., a DSF) enthalpy table 342 and an IAT enthalpy table 344 to determine a predicted enthalpy value for a CDA (e.g., DSF) mode and an IAT mode, respectively (e.g., a first predicted enthalpy value for the CDA and, particularly DSF, mode and a second predicted enthalpy value for the IAT mode). More specifically, the predicted enthalpy values may be determined based on using the CDA (e.g., DSF) enthalpy table 342 and the IAT enthalpy table 344 to "look up" a predicted enthalpy value based on one or more parameter values (e.g., an aftertreatment system temperature value, an engine operating parameter, etc.). For example, the one or more parameter values may correspond to a predicted enthalpy value in each of the CDA (e.g., DSF) enthalpy table 342 and the IAT enthalpy table 344. The DSF enthalpy table 342 and/or the IAT enthalpy table 344 is/are based on a one or more input values, such as a speed value and/or a torque value (e.g., the speed value and/or torque value described with respect to processes 322, 324, above). The DSF enthalpy table 342 and/or the IAT enthalpy table 344 include enthalpy values determined based on test data (e.g., data obtained from a testing apparatus separate from the system 100) for a set of speed and torque values. The DSF enthalpy table 342 and/or the IAT enthalpy table 344 may correlate enthalpy values to a DSF firing fraction value and/or an IAT position value based on the test data. Accordingly, the controller 140 may select a maximum enthalpy value and determine the CDA (e.g., DSF) fire fraction and/or IAT position that corresponds to the maximum enthalpy value. In an example embodiment, the enthalpy values of the CDA (DSF) enthalpy table 342 and/or the IAT enthalpy table 344 may be determined based on an enthalpy calculation. An example enthalpy calculation is shown by Equation 1 below where enthalpy (Q) is equivalent to the specific heat at a constant pressure ($C_p$), multiplied by the change in temperature ($T_1$-$T_0$), and multiplied by the mass flow rate of the exhaust gas (m).

$$Q = m\ C_p(T_1 - T_0)$$

In Equation 1, $T_0$ is the ambient air temperature, $T_1$ is the temperature of the exhaust gas exiting the engine (or a turbine coupled thereto). The temperatures, $T_0$ and $T_1$, may be determined based on sensor data from the sensors 125. The mass flow rate (m) may be determined based on sensor data from the sensors 125. $C_p$ is a function of temperature at a constant pressure and may be stored/retrieved from a look-up table in the controller 140. Accordingly, the CDA (e.g., DSF) enthalpy table 342 and/or the IAT enthalpy table 344 may include a specific heat table to determine $C_p$. As such, the formula turns to be Enthalpy=f(T,P) *TOT*Exhaust Flow.

In some embodiments, the controller 140 may determine whether to use the DSF mode or the IAT mode based on a predicted or determined fuel consumption or efficiency value (e.g., a predicted brake specific fuel consumption (BSFC)). BSFC refers to a measure of fuel efficiency of the system 100. More specifically, BSFC refers to fuel consumption per unit time (e.g., pounds of fuel per hour, kilograms of fuel per hour, etc.) divided by the brake power (e.g., brake horsepower). Accordingly, the controller 140 may use a DSF BSFC table 346 and an IAT BSFC table 348 to determine a predicted BSFC value for a CDA (e.g., DSF) mode and an IAT mode, respectively (e.g., a first predicted fuel consumption value for the CDA/DSF mode and a second predicted fuel consumption value for the IAT mode). More specifically, the predicted BSFC values may be determined based on using the CDA (e.g., DSF) BSFC table 346 and the IAT BSFC table 348 to "look up" a predicted enthalpy value based on one or more parameter values (e.g., an aftertreatment system temperature value, an engine operating parameter, etc.). For example, the one or more parameter values may correspond to a predicted BSFC value in each of the CDA (e.g., DSF) BSFC table 346 and the IAT BSFC table 348. The CDA (e.g., DSF) BSFC table 346 and/or the IAT BSFC table 348 is/are based on a one or more input values, such as a speed value and/or a torque value (e.g., the speed value and/or torque value described with respect to processes 322, 324, above). The CDA (e.g., DSF) BSFC table 346 and/or the IAT BSFC table 348 include BSFC values determined based on test data (e.g., data obtained from a testing apparatus separate from the system 100) for a set of speed and torque values. The CDA (e.g., DSF) BSFC table 346 and/or the IAT BSFC table 348 may correlate BSFC values to a CDA (e.g., DSF) fire fraction value and/or an IAT position value based on the test data. Accordingly, the controller 140 may select a minimum BSFC value and determine the CDA (e.g., DSF) fire fraction and/or IAT position that corresponds to the maximum enthalpy value.

In some embodiments, the method 300 may include determining whether to use a CDA (DSF) mode or an IAT mode based on the enthalpy and, if the difference between a DSF mode enthalpy and an IAT mode enthalpy is below a threshold value, determining whether to use a CDA (e.g., DSF) mode or an IAT mode based on the BSFC. In these embodiments, the method 300 continues to process 350.

At process 350, the controller 140 determines a difference in enthalpy between the CDA (e.g., DSF) mode and the IAT mode (e.g., a difference between the first predicted enthalpy value and the second predicted enthalpy value). At process 352, the controller 140 compares the difference in enthalpy to a fourth threshold. The fourth threshold may be a fourth maximum threshold. If the difference in enthalpy is at or above the maximum threshold, the method 300 continues to process 362. Thus, the controller 140 may determine that the operating mode includes the CDA mode based on determining that a difference between the first predicted enthalpy value and the second predicted enthalpy value is greater than the corresponding maximum threshold. If the difference in enthalpy is below the maximum threshold, the method 300 continues to process 354. At process 354, the controller 140 compares the difference in enthalpy to a fifth threshold. The fifth threshold may be a second minimum threshold. If the difference in enthalpy is at or above the minimum threshold, the method 300 continues to process 356. If the difference in enthalpy is below the minimum threshold, the method 300 continues to process 360. Thus, the controller 140 may determine that the operating mode includes the IAT mode based on determining that a difference between the first predicted enthalpy value and the second predicted enthalpy value is less than the corresponding minimum threshold.

At process 356, the controller 140 determines a difference in BSFC between the CDA (e.g., DSF) mode and the IAT mode (e.g., a difference between the first predicted fuel consumption value and the second predicted fuel consumption value). At process 358, the controller 140 compares the difference in BSFC to a sixth threshold. The sixth threshold may be a third minimum threshold. If the difference in BSFC is at or above the minimum threshold, the method 300 continues to process 360. Thus, the controller 140 may determine that the operating mode includes the IAT mode based on the difference between the first predicted fuel consumption value and the second predicted fuel consumption value being greater than the corresponding minimum threshold. If the difference in fuel consumption is below the minimum threshold, the method 300 continues to process 362. Thus, the controller 140 may determine that the operating mode includes the CDA (e.g., DSF) mode based on the difference between the first predicted fuel consumption value and the second predicted fuel consumption value being below the corresponding minimum threshold.

At process 360, the controller 140 uses an IAT charge table to determine one or more IAT mode parameters. At process 372, the controller 140 controls the engine to operate in the IAT mode. As described above, the controller 140 may cause the engine 101 to operate in the IAT mode based on the determined IAT charge flow amount that corresponds to an IAT valve position. Accordingly, the controller 140 outputs an IAT charge flow command that actuates the IAT valve to the corresponding position based on the one or more parameters determined at process 362.

At process 362 and with DSF, the controller 140 uses a DSF fire fraction table to determine one or more DSF mode parameters. At process 374, the controller 140 controls the engine to operate in the DSF mode. As described above, the controller 140 may cause the engine 101 to operate in the DSF mode based on the determined fire fraction. Accordingly, the controller 140 outputs a DSF fire fraction command based on the one or more parameters determined at process 362.

FIGS. 4A and 4B are diagrams representing a relationship between firing fraction and thermal output, according to an example embodiment. In particular, graph 402 depicts a relationship between fire fraction (or firing fraction) and an output temperature. Graph 404 depicts a relationship between fire fraction and an output enthalpy. The controller 140 may use this data to determine one or more DSF mode parameters. For example, the controller 140 may use the data represented in graph 402 and/or graph 404 to determine a DSF fire fraction in the method 300.

Figure 5:
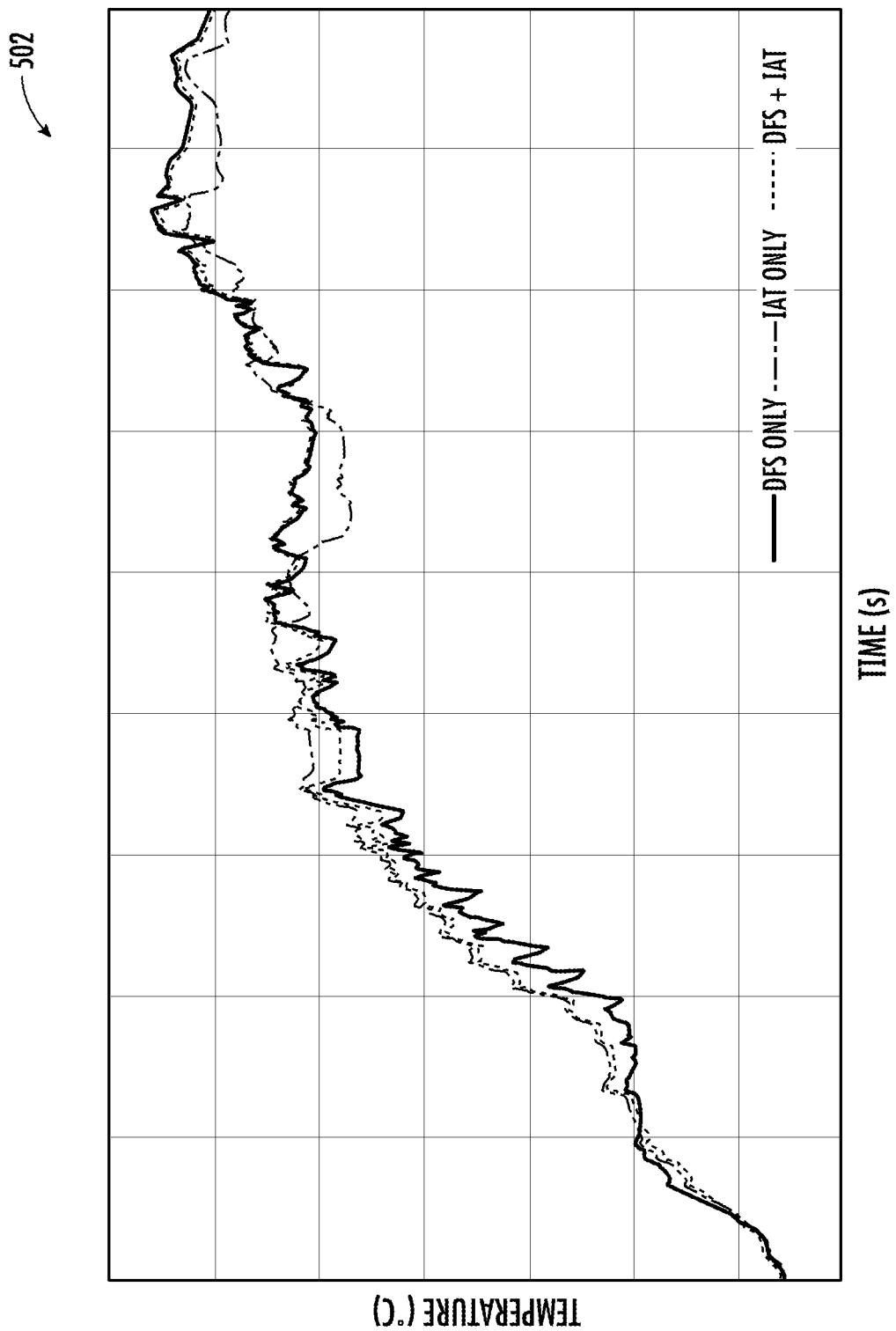
FIG. 5 is a diagram representing a relationship between time and temperature, according to an example embodiment.

FIG. 5 is a diagram representing a relationship between time and temperature, according to an example embodiment. In particular graph 502 depicts a relationship between time and temperature for the DSF mode only, for the IAT mode only, and for a combination of the DSF mode and the IAT mode.

Advantageously, the systems and methods described herein enable an improved thermal management mode for an exhaust aftertreatment system. The controller 140 may advantageously determine one or more thermal management parameters for an operating mode (e.g., a CDA/DSF mode or IAT mode) of a thermal management mode (e.g., a warm up mode or a keep warm mode). The controller 140 may determine the one or more thermal management parameters based on sensor data or other data described herein. For example, the controller 140 may use the method 300 to determine (a) whether the thermal management mode includes a keep warm mode or a warm up mode, (b) whether the operating mode includes an IAT mode, a DSF mode, or both, and/or (c) an IAT mode parameter (e.g., charge flow) and/or an DSF mode parameter (e.g., fire fraction) for the IAT mode or DSF mode, respectively. The controller 140 advantageously determines the thermal management parameters such that the system achieves a temperature target (e.g., over a minimum temperature or enthalpy), an emissions target (e.g., under a maximum $SONO_x$, over a minimum $deNO_x$ efficiency, etc.), and/or a fuel efficiency target (e.g., over a minimum fuel efficiency). Further, the thermal management parameters advantageously enable the system to reduce skip-loss heat transfer.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While various circuits with particular functionality are shown in FIG. 2, it should be understood that the controller 140 may include any number of circuits for completing the functions described herein. For example, the activities and functionalities of the sensor management circuit 210 and/or the thermal management circuit 212 may be combined in multiple circuits or as a single circuit. Additional circuits with additional functionality may also be included. Further, the controller 140 may further control other activity beyond the scope of the present disclosure.

As mentioned above and in one configuration, the "circuits" may be implemented in machine-readable medium for execution by various types of processors, such as the processor 204 of FIG. 2. Executable code may, for instance, comprise one or more physical or logical blocks of computer instructions, which may, for instance, be organized as an object, procedure, or function. Nevertheless, the executables need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Embodiments within the scope of the present disclosure include program products comprising computer or machine-readable media for carrying or having computer or machine-executable instructions or data structures stored thereon. Such machine-readable media can be any available media that can be accessed by a computer. The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device. Machine-executable instructions include, for example, instructions and data which cause a computer or processing machine to perform a certain function or group of functions.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present disclosure may be written in any combination of one or more other programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the apparatus and system as shown in the various exemplary embodiments is illustrative only. Additionally, any element disclosed in one embodiment may be incorporated or utilized with any other embodiment disclosed herein.

What is claimed is:

1. A system comprising:
an exhaust aftertreatment system in exhaust gas receiving communication with an engine, the exhaust aftertreatment system comprising a selective catalytic reduction system; and
a controller coupled to the engine and the exhaust aftertreatment system, the controller configured to:
receive a first temperature value associated with the exhaust aftertreatment system and a second temperature value associated with the engine;
determine, based on comparing the first temperature value to a first threshold, a thermal management mode, wherein the thermal management mode includes a first thermal management mode or a second thermal management mode;
determine, responsive to determining the thermal management mode and based on comparing the second temperature value to a second threshold, an operating mode for the thermal management mode, wherein the operating mode includes at least one of a first operating mode or a second operating mode;
determine that the thermal management mode is the first thermal management mode based on determining that the first temperature value is below the first threshold, wherein the first thermal management mode is a warm up mode configured to increase a temperature of the exhaust gas;
determine that the thermal management mode is the second thermal management mode based on determining that the first temperature value is at or above the first threshold, wherein the second thermal management mode is a keep warm mode configured to maintain the temperature of the exhaust gas;
determine that the operating mode includes both of the first operating mode and the second operating mode based on determining that the second temperature value is above the second threshold, wherein the first operating mode is a cylinder deactivation CDA mode and the second operating mode is an intake-air throttle IAT mode; and
initiate the at least one of the first or the second operating mode.

2. The system of claim 1, wherein the first temperature value is at least one of a temperature of the selective catalytic reduction system or a change in temperature over time of the selective catalytic reduction system.

3. The system of claim 1, wherein the second temperature value is a temperature of an engine fluid.

4. The system of claim 1, wherein determining the operating mode is further based on one or more engine operating parameters, the one or more engine operating parameters comprising at least one of an engine speed or an engine torque.

5. The system of claim 1, wherein the controller is further configured to determine that the operating mode does not include the first operating mode based on determining that the second temperature value is below the second threshold.

6. The system of claim 5, wherein the controller is further configured to:
determine a CDA mode parameter comprising a firing fraction for the CDA mode; and
determine an IAT mode parameter comprising a charge flow for the IAT mode.

7. The system of claim 1, wherein in determining the operating mode, the controller is further configured to:
determine a first predicted enthalpy value for the CDA mode;
determine a second predicted enthalpy value for the IAT mode;
determine, based on determining that a difference between the first predicted enthalpy value and the second predicted enthalpy value is greater than a first maximum threshold, that the operating mode includes the first operating mode; and
determine, based on determining that the difference between the first predicted enthalpy value and the second predicted enthalpy value is less than a first minimum threshold, that the operating mode includes the second operating mode.

8. The system of claim 7, wherein in determining the operating mode, the controller is further configured to:
determine a first predicted fuel consumption value for the CDA mode;
determine a second predicted fuel consumption value for the IAT mode;
determine that the operating mode includes the first operating mode based on a difference between the first predicted fuel consumption value and the second predicted fuel consumption value being less than a second minimum threshold; and
determine that the operating mode includes the second operating mode based on the difference between the first predicted fuel consumption value and the second predicted fuel consumption value being greater than the second minimum threshold.

9. A method comprising:
receiving a first temperature value associated with an exhaust aftertreatment system and a second temperature value associated with an engine;
determining, based on comparing the first temperature value to a first threshold, a thermal management mode, the thermal management mode including one of a first thermal management mode or a second thermal management mode;
determining, responsive to determining the thermal management mode and based on comparing the second temperature value to a second threshold, an operating mode for the determined one of the first thermal management mode or the second thermal management mode, the operating mode comprising at least one of a first operating mode or a second operating mode;
determining that the thermal management mode is the first thermal management mode based on determining that the first temperature value is below the first threshold, wherein the first thermal management mode is a warm up mode configured to increase a temperature of the exhaust gas;
determining that the thermal management mode is the second thermal management mode based on determining that the first temperature value is at or above the first threshold, wherein the second thermal management mode is a keep warm mode configured to maintain the temperature of the exhaust gas;
determining that the operating mode includes both of the first operating mode and the second operating mode based on determining that the second temperature value is above the second threshold, wherein the first operating mode is a cylinder deactivation CDA mode and the second operating mode is an intake-air throttle IAT mode; and
initiating the at least one of the first operating mode or the second operating mode.

10. The method of claim 9, wherein the first temperature value is at least one of a temperature of a selective catalytic reduction system or a change in temperature over time of the selective catalytic reduction system.

11. The method of claim 9, wherein the second temperature value is a temperature of an engine fluid.

12. The method of claim 9, wherein determining the operating mode is further based on one or more engine operating parameters, the one or more engine operating parameters comprising at least one of an engine speed or an engine torque.

13. The method of claim 9, further comprising determining that the operating mode does not include the first operating mode based on determining that the second temperature value is below the second threshold.

14. The method of claim 13, further comprising:
determining a first operating mode parameter for the first operating mode; and
determining a second operating mode parameter for the second operating mode.

15. A method comprising:
receiving a first temperature value associated with an exhaust aftertreatment system and a second temperature value associated with an engine;
determining, based on comparing the first temperature value to a first threshold, a thermal management mode, the thermal management mode including one of a first thermal management mode or a second thermal management mode;
determining, responsive to determining the thermal management mode and based on comparing the second temperature value to a second threshold, an operating mode for the determined one of the first thermal management mode or the second thermal management mode, the operating mode comprising at least one of a first operating mode or a second operating mode, wherein determining the operating mode comprises:
determining a first predicted enthalpy value for the first operating mode;
determining a second predicted enthalpy value for the second operating mode;
determining that the operating mode includes the first operating mode based on determining a difference between the first predicted enthalpy value and the second predicted enthalpy value being greater than a first maximum threshold; and
determining that the operating mode includes the second operating mode based on determining that the difference between the first predicted enthalpy value and the second predicted enthalpy value is less than a first minimum threshold; and
initiating the at least one of the first operating mode or the second operating mode.

16. A system structured to enable a thermal management mode for an engine system, the system comprising:
at least one processor; and
at least one memory coupled to the at least one processor, the at least one memory storing instructions therein that, when executed by the at least one processor, cause operations comprising:
receiving a first temperature value associated with an exhaust aftertreatment system of the engine system and a second temperature value associated with an engine of the engine system;
determining, based on comparing the first temperature value to a first threshold, a thermal management mode;
determining, an operating mode based on determining the thermal management mode and based on comparing the second temperature value to a second threshold;
determining that the thermal management mode is a first thermal management mode based on determining that the first temperature value is below the first threshold, wherein the first thermal management mode is a warm up mode configured to increase a temperature of the exhaust gas;
determining that the thermal management mode is a second thermal management mode based on determining that the first temperature value is at or above the first threshold, wherein the second thermal management mode is a keep warm mode configured to maintain the temperature of the exhaust gas;
determining that the operating mode includes both of a first operating mode and a second operating mode based on determining that the second temperature value is above the second threshold, wherein the first operating mode is a cylinder deactivation CDA mode and the second operating mode is an intake-air throttle IAT mode; and
initiating the operating mode with the engine system.

17. A system structured to enable a thermal management mode for an engine system, the system comprising:
at least one processor; and
at least one memory coupled to the at least one processor, the at least one memory storing instructions therein that, when executed by the at least one processor, cause operations comprising:
receiving a first temperature value associated with an exhaust aftertreatment system of the engine system and a second temperature value associated with an engine of the engine system;
determining, based on comparing the first temperature value to a first threshold, a thermal management mode;
determining, an operating mode based on determining the thermal management mode and based on comparing the second temperature value to a second threshold, wherein determining the operating mode comprises:
determining a first predicted enthalpy value for a first operating mode;
determining a second predicted enthalpy value for a second operating mode;
determining, based on determining that a difference between the first predicted enthalpy value and the second predicted enthalpy value is greater than a first maximum threshold, that the operating mode includes the first operating mode;
determining, based on determining that the difference between the first predicted enthalpy value and the second predicted enthalpy value is less than a first minimum threshold, that the operating mode includes second operating mode; and
initiating the operating mode with the engine system.

* * * * *